United States Patent [19]
Striegl

[11] 4,239,425
[45] Dec. 16, 1980

[54] CHUCKING REAMER

[75] Inventor: Georg Striegl, Winterlingen, Fed. Rep. of Germany

[73] Assignee: Firma August Beck, Winterlingen, Fed. Rep. of Germany

[21] Appl. No.: 45,069

[22] Filed: Jun. 4, 1979

[51] Int. Cl.³ .............................. B23B 29/02
[52] U.S. Cl. .................... 408/181; 408/185
[58] Field of Search ............ 408/186, 199, 181, 713, 408/705, 153, 179, 185, 197, 239 R, 231, 238, 226

[56] References Cited

U.S. PATENT DOCUMENTS 3,286,557  11/1966  Rietzler et al. ............... 408/179

FOREIGN PATENT DOCUMENTS 1502869  6/1969  Fed. Rep. of Germany ........... 408/199
1435339  5/1976  United Kingdom .................. 408/181

*Primary Examiner*—Gil Weidenfeld

[57] ABSTRACT

A chucking reamer has a flattened section on its head, with a crescent-shaped recess. A crescent-shaped body which retains a cutter device is held in the cresent-shaped recess by a fixing screw and a pair of headless screws are threaded into the head to adjust the position of the crescent-shaped body and the cutting device. The carbide cutter device and the steel crescent-shaped body are in one piece. The fixing screw has a conical head which fits into a conical recess in the crescent-shaped body. An inner threaded hole is provided through the head, running perpendicularly from the bottom face of the crescent-shaped recess, for receiving the shank of the fixing screw. The longitudinal axis of this inner threaded hole is displaced downwards in relation to the longitudinal axis of the conical recess, so that when the crescent-shaped body is to be moved to the smallest radius position and the fixing screw is tightened, the shank of the fixing screw experiences a bending stress, which pulls the crescent-shaped body as close as possible to the curved walls of the crescent-shaped recess.

8 Claims, 3 Drawing Figures

CHUCKING REAMER

The invention relates to a chucking reamer. Such chucking reamer has a flattened section on its head with a crescent-shaped recess. The cutting device is retained against a support surface by a crescent-shaped body which is held in the crescent-shaped recess by a fixing screw. An inner threaded hole is provided in the head for receiving the shank of the fixing screw. A pair of headless screws are threaded into the head to adjust the position of the crescent-shaped body and the cutting device. Chucking reamers of this type are used in the diameter range from 10 to 80 mm.

BACKGROUND OF THE INVENTION

A chucking reamer of this type has the following disadvantages, among others:

(a) The cutter device is in this case a cemented-carbide tip in the form of a reversible cutter. Cemented-carbide is both expensive and splinters like glass. Most of the volume of cemented-carbide sold is not used for cutting at all, and only a few out of every thousand perform cutting work. If the carbide tip is destroyed during use of one of its cutters, then the other cutter is also simultaneously destroyed, so that no use can be made of its reversing tip properties.

(b) Cemented-carbide has a much lower coefficient of thermal conductivity than tool steel, for example. Grinding must therefore be carried out very carefully. Chucking during grinding may also lead to fracture and also must be carried out very carefully.

(c) The carbide tip is retained in a non-positive manner by clamping. Very large forces are required for clamping, and since the carbide tip is as ground on all sides, it represents a very smooth object which is difficult to retain by clamping, in principle.

(d) The carbide tip must be wide in order to obtain sufficient clamping area. This means that a groove must be milled deeply into the head of the reamer to receive the carbide tip. Such a deep groove weakens the head, but a steeply inclined head is preferable, because chucking reamers must operate to a high degree of precision and therefore must not become deformed or distorted.

(e) The groove for receiving the carbide tip is produced by a side milling cutter. For reasons of manufacture, the groove requires an opening in the front of the head of the reamer. However, a centering hole is also required in the front of the head, because it must be possible to machine the complete chucking reamer between centers. In the case of small reamer diameters, e.g. 10 mm, the requirement for the deep groove on the one hand, and the centering hole on the other, means that a pin must be projected from the front of the head, the pin being 10 mm long, for example. This pin would in turn support the centering hole at the front. The groove would then run into the pin. The additional pin makes manufacture more expensive, and in particular it naturally obstructs the chucking reamer until the bottom of a hole is reached. The pin cut by the groove is not bend-resistant either.

(f) The crescent-shaped body is difficult to manufacture: it is machined on all sides and has an internal thread. The direction of rotation of the internal thread is opposite to the direction of rotation of the internal thread in the bottom face of the crescent-shaped recess. It includes a differential screw which is provided with two opposing threads and which draws the crescent-shaped body towards the carbide tip. Screwing in the differential screw is difficult. To ensure that the crescent-shaped body is sufficiently guided, it is provided with a collar at the end of its thread, which corresponds to a supplementary recess in the bottom face.

(g) Because of the geometry of the support faces/groove/carbide tip, the pressure pieces of the headless screws (grub screws) must have a wedge face, as shown, for example, in FIG. 2 of West German Pat. No. 1,427,182. This means higher manufacturing costs for the pressure (thrust) pieces and for correct fitting.

(h) For a number of reasons the degree of flattening of the head may be very low. This means that the cutting space will be very small, and the known chucking reamer therefore requires a special cutting chip discharge groove in the front face area.

(i) Adjustment for correct positioning of the cutting edge of the carbide tip is very complicated, lengthy and can only be carried out after special training. A special tool must be used for rapid operation. During adjustment, the pressure (thrust) piece is pressed linearly against the brittle carbide tip, with very large forces. The headless grub screws must then be rotated inwards if the diameter is to be increased. If the diameter is to be reduced, the differential screw must be loosened, the grub screws turned outwards, the carbide tip pressed so that it is pushed further into the groove, until it stops at some point inside the groove. Only then can the grub screws be turned inwards again, after the differential screw has first been tightened.

(j) Since the carbide tip must be clamped, the head cannot be hardened and must therefore remain soft.

(k) The heat dissipation from the carbide tip is unfavorable, since cemented-carbide—as stated above—has a low thermal conductivity, and since there are only a few essentially punctiform arrangements in the head.

OBJECTS AND STATEMENT OF THE INVENTION

The chucking reamer just described is in practice one of the most successful chucking reamers, and has not been selected merely to stress the specific characteristics of the invention.

The objective of the invention is to indicate a chucking reamer of the type already mentioned, which largely avoids the above-mentioned disadvantages.

According to the invention, this objective is achieved by the following characteristics.

The cutter device and the crescent-shaped body are in one piece and comprise a basic body of steel and a carbide cutter embedded in the basic body;

the fixing screw has a conical head and the crescent-shaped body has a conical recess; and the geometrical longitudinal axis of the inner threaded hold in the head which receives the shank of the fixing screw, in the perpendicular direction to the cutting edge of the carbide cutter and the plane of the bottom face, is eccentric in relation to the geometrical longitudinal axis of the conical recess, to the extent that when the basic body is to be moved to the smallest radium position, the shank of the fixing screw experiences a bending stress.

The bottom face runs steplessly and evenly into the support face and the basic body has a flat lower side. Both the manufacture of the head and the basic body are simplified by this characteristic. There are large opposing surfaces, and there is no contact with a step, which would otherwise be present, when the basic body (and cutter or cutting edge) is moved.

The lower face of the basic body runs perpendicularly into the rear side of the crescent-shaped body and the bottom face runs perpendicularly into the curved face of the crescent-shaped recess. A simple geometry and hence simple manufacturing are obtained by this characteristic.

The conical recess is sufficiently countersunk in the crescent-shaped body so that the upper side of the conical head lies approximately flush with the upper side of the cutter. This characteristic permits the forces produced by the deformation of the shank of the fixing or clamping screw to be directed to a favorable point so that the tilting moment on the basic body will either be small or even nil.

A support plate is provided opposite the cutting edge of the cutter and the headless screw holes commence on the lead side just in front of the support plate, run parallel with the bottom face and intersect the flush bases according to a sector. Because of this characteristic, the support plate can be fitted at the correct point, and the correct direction of operation is obtained for the grub screws.

The crescent-shaped body has about 50–80% of the length of the entire basic body at its widest point, preferably 60–70% of the length. Because of this characteristic, the cutting edge is provided with a stable back, and there is sufficient space for the fixing screw and for contact of the thrust pieces.

The crescent-shaped body has roughly the shape of a slice of apple. As a result of this characteristic, there is sufficient material around the conical recess, a rigid, crescent-shaped body is obtained, and the crescent-shaped recess is filled so that the flattening on top is generally continuous.

DESCRIPTION OF THE DRAWINGS

The invention is now described by means of a preferred embodiment. In the Drawings, to a scale of 10:1.

DETAILED DESCRIPTION OF A PREFERRED EMBODIMENT

Figure 2:
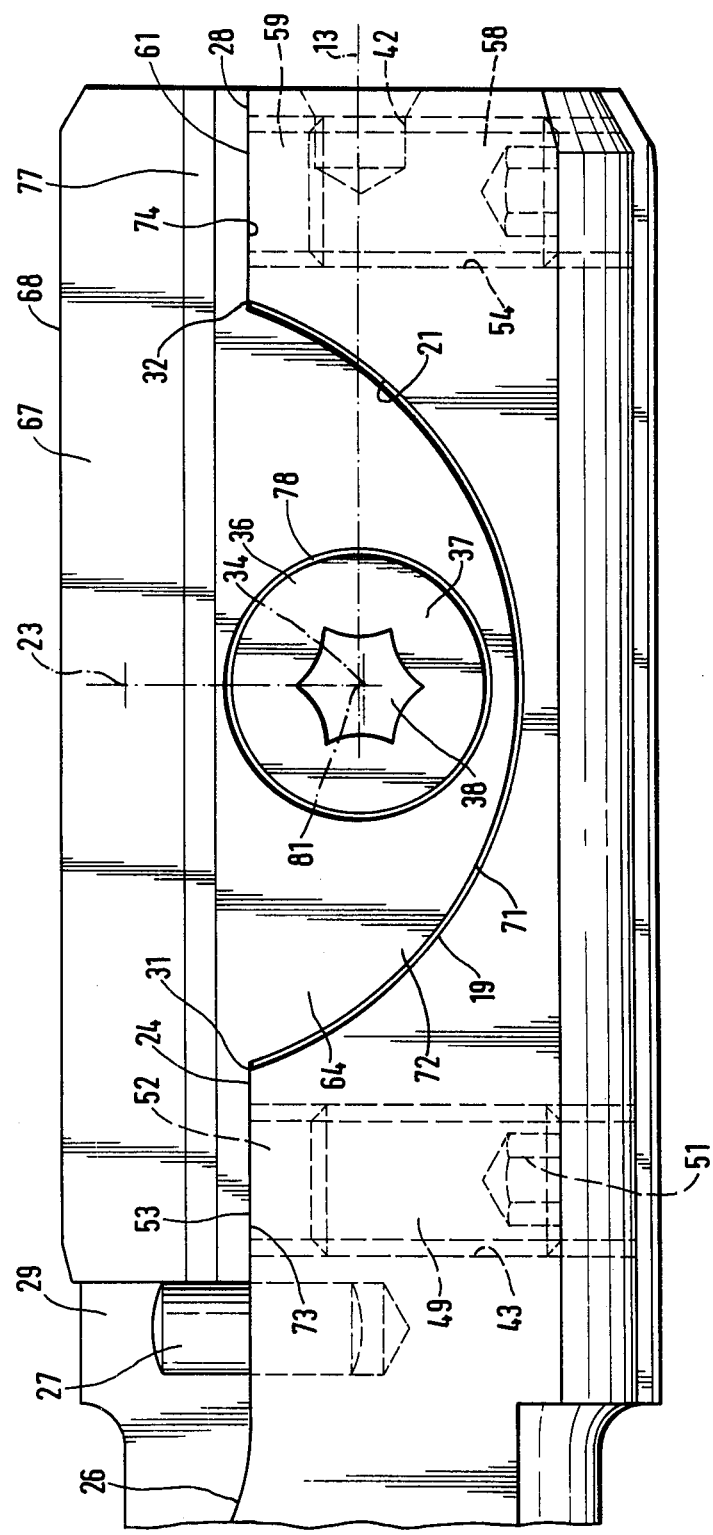
FIG. 2 shows a view along arrow A in FIG. 1, but only in the head area.

A chucking reamer, not fully shown, has a shaft 11, with a radius 14, which in the area drawn has a diameter of about 8 mm. To this is connected, in one section, a head 12, which, when solid, had a diameter of 9.5 mm. The shaft and body are cast (annealed) from heat-treatable steel, and stress relieved, and have an HRc hardness of 26–30. The reamer is rotatable about a geometric longitudinal axis 13. A flattened section 16 commences on shaft 11, this section having an angle of 60° to plane 17, and being produced during manufacture by a milling cutter which is moved parallel with the longitudinal axis 13, after the end of the radius 14, as far as front faces 18 of the head. This flattened section is intersected by a crescent-shaped recess 19 (in head 12), which exhibits a curved face 21 and a bottom face 22. Curved face 21 is perpendicular to bottom face 22. Both are produced by a milling cutter which is moved into the head 12 parallel with plane 17 intersecting the flattened section 16, and in doing so has an axis of rotation according to cross 23 (FIG. 2). The milling cutter has a diameter of about 6.7 mm. Curved face 21 therefore runs along this radius. According to FIG. 2, to the left of curved face 21, this face runs into a base 24, which is perpendicular to the drawing plane in FIG. 2, and is about 2.3 mm high. To the left, base 24 runs outwards with a radius 26. In front of radius 26, a stop pin 27, which does not project beyond the circumference of head 12, projects vertically from base 24. To the right in FIG. 2, curved face 21 runs into a second base 28, which lies flush with base 24, is as high as base 24 and is also perpendicular to the drawing plane in FIG. 2. To the right, base 28 goes into front face 18.

Bottom face 22 runs smoothly and evenly into a support face 29, which is also flat, has practically the shape of an oblong rectangle, is perpendicular with bottom face 22 to plane 17, to the right runs into front face 18, and to the left, emerges after stop pin 27, with radius 26. Support face 29 is manufactured entirely by means of the front cutting edges of the milling cutter which also produces crescent-shaped recess 19, which is moved parallel to longitudinal axis 13, and in doing so automatically also produces base 24 and base 28. Defined corners (angles) 31, 32 are therefore also obtained without difficulty.

At right angles to bottom face 22, an inner thread 33 is provided continuously, runs from the bottom face and has the dimension 2.5 mm. The geometrical longitudinal axis 34 of inner thread 33 as seen in the view in FIG. 2, is displaced downwards a distance of 0.2 mm in relation to longitudinal axis 13, and hence also in relation to plane 17. A Torx screw 36 has a front face 37 with an inner polygon 38. It has a conical head and hence a conical face 39. Conical face 39 runs into a shaft 41, which is screwed into inner thread 33.

A centering hole 42 is drilled from front face 18 coaxially with the geometrical longitudinal axis 13, to which hole a second centering hole corresponds at the other end of shaft 11.

Figure 1:
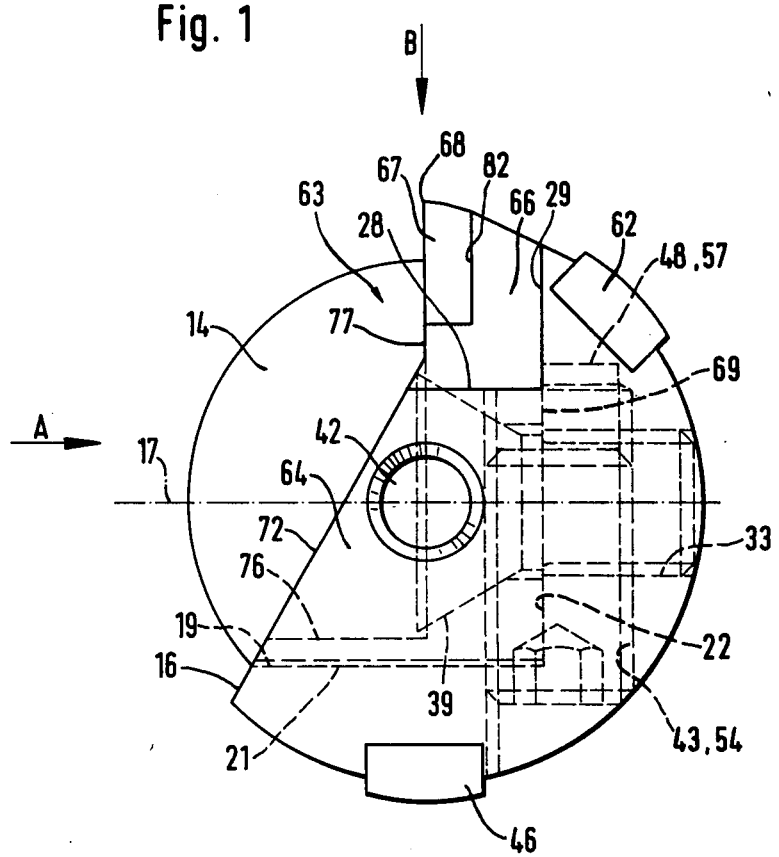
FIG. 1 shows a view of the front face of the head.
Figure 3:
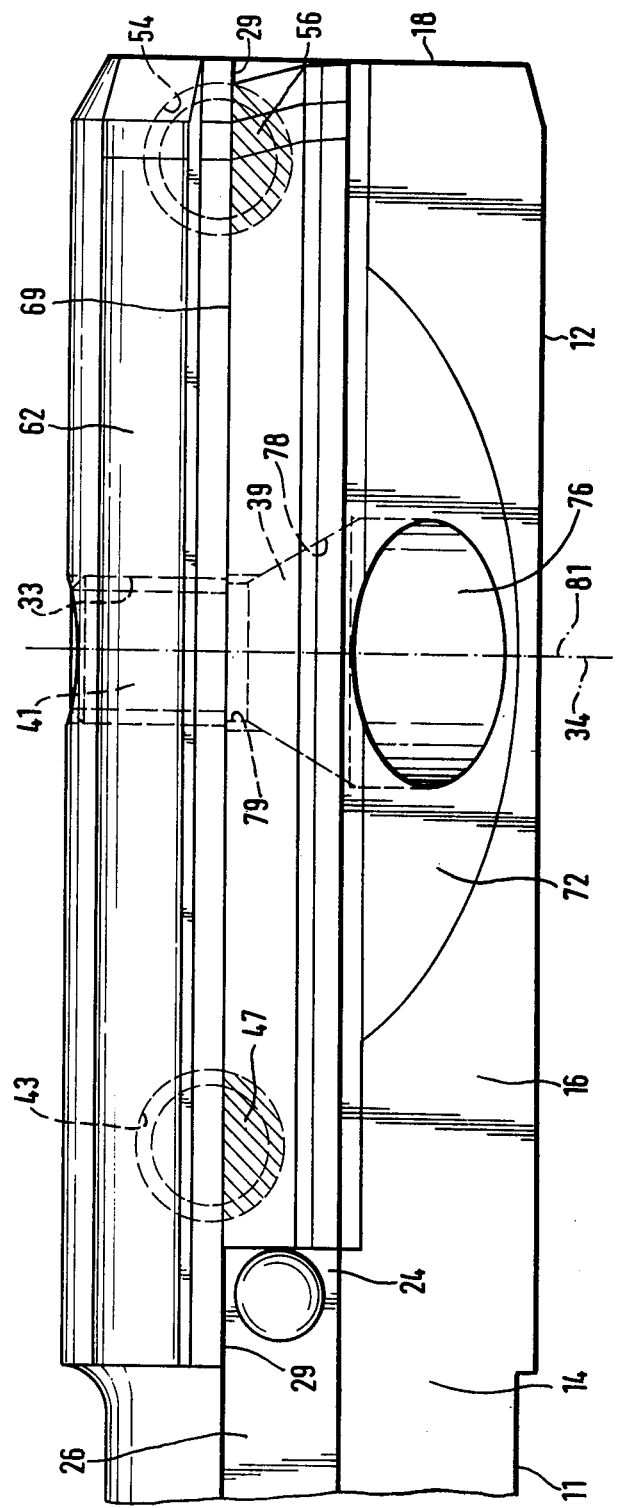
FIG. 3 shows a view along arrow B in FIG. 1, but only in the head area.

A grub (headless) screw hole 43 extends substantially parallel with the drawing plane in FIG. 2, from below, according to FIG. 1, just beyond a guide plate 46, which according to FIG. 1 is in the 6 o'clock position. Grub screw hole 43 extends perpendicularly to the geometrical longitudinal axis 13, and cuts deeply into support face 29. Thus, with an almost semi-circular contour 47 represented by shading in FIG. 3, it emerges from base 24. In this case, the shading does not denote a cutting face. The inner end of grub screw hole 43 is the pocket hole face 48, shown in FIG. 1, which extends into support face 29, as already described.

A grub (headless) screw 49, which has an inner polygon 51, in its accessible front face, is screwed into grub screw hole 43. On its inaccessible inner face lies a regular cylindrical pressure plate 52, which is axially guided by grub screw hole 43. Outer front face 53 of this pressure plate 52 may assume different positions. In the drawing, front face 53 lies flush with base 24. If grub screw 49 is rotated further inwards, pressure plate 52 emerges partially from base 24, and with a face similar to contour 47 minus the thread height.

As FIG. 2 shows, grub screw hole 43 is adequately spaced from angle or corner 31, and adequately spaced from stop pin 27.

A second grub (headless) screw hole 54 is provided to the right of crescent-shaped recess 19. It is axially parallel with grub screw hole 43, substantially parallel with bottom face 22, i.e. with the drawing plane in FIG. 2, runs according to FIG. 1 just underneath centering hole 42, emerges from base 28 with a shaded contour 56, and extends its pocket hole face 57, as pocket hole face 48 extends into support face 29.

Grub screw hole 54 is adequately spaced from front face 18 and also from corner 32. A grub (headless) screw 58 is screwed into the hole, and with grub screw 58 a pressure plate 59 can also be pushed forward. The pressure plate has a front face 61. Here too front face 61 lies flush with base 28, as in the drawing according to FIG. 2. However, since grub screw hole 54 also extends into support face 29, front face 61 is able to project from base 28 when grub screw 58 is screwed in sufficiently.

According to FIG. 1, a second guide plate 62 is provided. It is staggered by 135° in the clockwise direction, in relation to plane 17, and its bed does not intersect pocket hole faces 48, 57, and is naturally also adequately spaced from support face 29. Both guide plate 46 and guide plate 62 extend over the entire length of head 12.

A basic body 63 is annealed from steel and stress relieved, and has an HRC hardness of 26 to 30. It comprises a crescent-shaped body 64 and a roughly rectangular shaped plate 66, which extends according to FIG. 2 in front of and on both sides of crescent-shaped body 64. Plate 66 supports a carbide cutter 67, which has a cutting edge 68.

Basic body 63 has a flat lower side 69. Curved face 71 of crescent-shaped body 64 is at least 0.15 mm from the curved face 21 in any operating condition. Upper side 72 of crescent-shaped body 64 lies flush with flattened section 16. Plate 66 extends according to FIG. 2 to the left of curved face 71 in parallel with base 24, with a back face 73, as far as stop pin 27, and is therefore located over contour 47. To the right, curved face 72 runs into a similar back face 74, which extends as far as front face 18, and is located just over contour 56.

A cylindrical hole 76 is provided in crescent-shaped shaped body 64, from above, perpendicular to the drawing plane in FIG. 2. According to FIG. 1, level with the upper side 77 of plate 66, cylindrical hole 76 passes into conical hole 78. Further down, conical hole 78 again passes into a short cylindrical hole 79. As is clear from a comparison between FIGS. 1 and 2, the geometrical longitudinal axis 81 lies in plane 17. Longitudinal axis 34 is therefore displaced downwards by 0.2 mm in relation to longitudinal axis 81, according to FIG. 2. This means that when screw 37 is tightened, shaft 41 is stressed to the point of bending, in the direction of cross 23. This bending causes conical face 39 of screw 36 to be pressed against conical face 78 in the 6 o'clock position (FIG. 2), and therefore pulls crescent-shaped body 64 as far as possible towards curved face 21. At the same time, however, lower side 69 is also drawn with some of the screw force towards bottom face 22 and support face 29.

Carbide cutter 67 is soldered into a stepped recess 82 of plate 66, and extends from stop pin 27 to flush with front face 18. About 30% of the height of plate 66 receives carbide cutter 67, according to thickness, and about 66% of the width of plate 66 receives carbide cutter 67, according to the width. In terms of volume, carbide cutter 67 occupies about one third of the volume of plate 66.

A plane running through the upper side of carbide cutter 67 and upper side 77 bisects guide plate 46, according to FIG. 1.

Cutting edge 68 must be adjusted before using a chucking reamer. In this case the area of cutting edge 68 shown on the right of FIG. 2 must lie on a slightly larger diameter than the area of cutting edge 68 to the left. For this purpose it is only necessary to screw grub screws 49, 58 far enough into grub screw hole 43, 54, so that front faces 53, 61 force back faces 73, 74 according to FIG. 2 far enough upwards or far enough outwards, viewed from longitudinal axis 13. Shaft 41 then produces sufficient readjusting or return force which increases the further grub screws 49, 58 are screwed in.

If one or both of grub screws 49, 58 are screwed too far in, i.e. if the diameter is set too high, then the grub screw in question is again screwed outwards slightly, and shaft 41 returns the entire basic body 63, because of its initial spring tension, including cutting edge 68 of course.

Plate 66 lies flush with a large area of support face 29. It is very well supported and retained from below by crescent-shaped body 63. The contact face of pressure plates 52, 59 is sufficiently large, and lies in the correct position to force basic body 63 outwards. Since the wing areas of plate 66 project only a little beyond crescent-shaped body 64, they must in practice also be regarded as rigid for small reamer dimensions, because the pressure plates 52, 59 also come into sufficiently close contact with front face 18 and contact face 73.

What I claim is:

1. A chucking reamer comprising:
   (a) a head having a flattened section, commencing on the shaft, the outer face of this section having essentially the shape of a secant;
   (b) a crescent-shaped recess, bounded by a curved face and a bottom face, running from the flattened section into the head;
   (c) an inner threaded hole provided in the head, running from the central area of the bottom face into which thread the shank of a fixing screw can be screwed;
   (d) two narrow, flush bases adjacent to the bottom face and on both sides of it, extending in the longitudinal direction of the shank substantially parallel with the fixing screw;
   (e) a support face adjacent to the bottom face and on both sides of it, extending in the longitudinal direction of the shank substantially perpendicular to the fixing screw, intersecting the flush bases and terminating in the front of the head together with one of the flush bases;
   (f) a centering hole in the front of the head;
   (g) two headless screw holes provided in the head substantially axially parallel with each other, positioned in the head according to a secant, and each opening in one of the flush bases;
   (h) headless screws screwed into the headless screw holes, each of which acts on a thrust piece whose area of thrust action is located in the region of the flush base and support face;
   (i) a cutter device having a flat lower side in contact with the support face and a back ridge in contact with the thrust pieces;
   (j) a crescent-shaped body in the crescent-shaped recess which is traversed by the fixing screw which retains the cutting device by means of the crescent-shaped body;
   (k) guide plates on the head; and
   comprising the improvements in which
   (l) the cutter device and the crescent-shaped body are in one piece and comprise a basic body of steel and a carbide cutter embedded in the basic body;

(m) the fixing screw has a conical head and the crescent-shaped body has a conical recess; and (n) the geometrical longitudinal axis of the inner thread in the perpendicular direction to the cutting edge of the carbide cutter, and the plane of the bottom face, is eccentric in relation to the geometrical longitudinal axis of the conical recess, to the extent that when the basic body is to be moved to the smallest radius position, the shank of the fixing screw experiences a bending stress.

2. Chucking reamer according to claim 1, in which the bottom face runs steplessly and evenly into the support face and that the basic body has a flat lower side.

3. Chucking reamer according to claim 1 or 2, in which the lower face of the basic body runs perpendicularly into the rear side of the crescent-shaped body and in that the bottom face runs perpendicularly into the curved face of the crescent-shaped recess.

4. Chucking reamer according to claim 1, in which the conical recess is sufficiently countersunk in the crescent-shaped body so that the upper side of the conical head lies approximately flush with the upper side of the cutter.

5. Chucking reamer according to claim 1, in which a support plate is provided opposite the cutting edge of the cutter and the headless screw holes commence on the lead side just in front of the support plate, run parallel with the bottom face and intersect the flush base according to a sector.

6. Chucking reamer according to claim 1, in which the crescent-shaped body has about 50–80% of the length of the entire basic body at its widest point.

7. Chucking reamer according to claim 1, in which the crescent-shaped body has about 60–70% of the length of the entire basic body at its widest point.

8. Chucking reamer according to claim 1, in which the crescent-shaped body has roughly the shape of a wedge.

* * * * *